United States Patent [19]

Geibel et al.

[11] Patent Number: 5,177,174
[45] Date of Patent: Jan. 5, 1993

[54] BRANCHED AROMATIC SULFIDE/SULFONE POLYMER PRODUCTION

[75] Inventors: Jon F. Geibel; Rex L. Bobsein, both of Bartlesville, Okla.

[73] Assignee: Phillips Petroleum Company, Bartlesville, Okla.

[21] Appl. No.: 810,605

[22] Filed: Dec. 19, 1991

[51] Int. Cl.$^5$ ............................................. C08G 75/16
[52] U.S. Cl. ..................................... 528/174; 528/171; 528/388
[58] Field of Search .................... 528/174, 171, 388

[56] References Cited

U.S. PATENT DOCUMENTS

| | | | |
|---|---|---|---|
| 3,960,815 | 6/1976 | Darsow et al. | 260/49 |
| 4,127,713 | 11/1978 | Campbell | 528/391 |
| 4,525,579 | 1/1985 | Idel et al. | 528/388 |
| 4,654,410 | 3/1987 | Kashiwame et al. | 528/171 |
| 4,774,276 | 9/1988 | Bobsein et al. | 524/399 |
| 4,808,698 | 2/1989 | Bobsein et al. | 528/388 |

*Primary Examiner*—Harold D. Anderson
*Attorney, Agent, or Firm*—A. W. Umphlett

[57] ABSTRACT

A first reaction mixture of at least one dihalo aromatic sulfone, at least one polyhydroxy aromatic compound, at least one organic amide and at least one alkali metal carbonate is contacted under polymerization conditions including a period of time at a temperature sufficient to form a reaction product, with the resulting product mixture being contacted with at least one polymerizable sulfur source, at least one organic amide, at least one alkali metal carboxylate, and water under polymerization conditions including a period of time at a temperature sufficient to form a branched aromatic sulfide sulfone polymer. The resulting polymers are useful in the production of coatings, films, molded objects, and fibers.

22 Claims, No Drawings

BRANCHED AROMATIC SULFIDE/SULFONE POLYMER PRODUCTION This invention relates to the production of polymer aromatic compounds. In one of its aspects this invention relates to the production of branched aromatic sulfide sulfone polymer. In accordance with another aspect, this invention relates to a process for the production of aromatic sulfide sulfone polymer by contacting dihalo aromatic sulfone, alkali metal carbonate, polymerizable sulfur source, organic amide, alkali metal carboxylate, polyhydroxy aromatic compound and a sufficient amount of water including water of hydration to produce a branched polymer which thereby has a higher molecular weight than obtained without the presence of the polyhydroxy aromatic compound. In accordance with a further aspect, this invention relates to the production of p-phenylene sulfide sulfone polymer of increased molecular weight by contacting bis(p-halophenyl)sulfone, alkali metal carbonate, polymerizable sulfur source, organic amide, alkali metal carboxylate, polyhydroxy aromatic compound and at least 3.5 moles of water per mole of polymerizable sulfur source under polymerization conditions including elevated temperature and a period of time sufficient to form branched aromatic sulfide sulfone polymer of increased molecular weight as compared to polymer prepared without the presence of the polyhydroxy aromatic compound.

In recent years, a wide variety of high polymers has been prepared, much of which is currently being produced and marketed on a large scale. While such polymers are useful in many areas, one property of high polymers, particularly thermoplastic high polymers, which needs to be improved is the ability to withstand high temperatures. Since thermoplastic materials can be molded rapidly and efficiently into almost any desired shape, they lend themselves to mass production. High polymers, especially thermoplastic high polymers, which will stand very high temperatures can be used in such areas as electrical components, wire coatings, automotive parts, and the like have been the objective of a great deal of research.

This invention provides branched aromatic sulfide sulfone polymer of high molecular weight and a novel process for the production of this polymer. Such polymer is more desirable as molding resin than is aromatic sulfide sulfone polymer of lower molecular weight since properties of the product molded from polymer of higher molecular weight are superior to product molded from polymer of lower molecular weight.

Accordingly, an object of this invention is to produce branched aromatic sulfide sulfone polymer exhibiting higher molecular weight than is obtained without the presence of polyhydroxy aromatic compound.

Another object of this invention is to provide a process for producing high molecular weight, branched aromatic sulfide sulfone polymer exhibiting good melt processing properties.

Other objects, aspects, and the several advantages of this invention will be apparent on a study of this disclosure and the appended claims.

In accordance with this invention, branched aromatic sulfide sulfone polymer is produced by contacting at least one dihalo aromatic sulfone, at least one polymerizable sulfur source, at least one organic amide, at least one alkali metal carboxylate, at least one polyhydroxy aromatic compound and water including water of hydration under polymerization conditions for a period of time sufficient to form an aromatic sulfide sulfone polymer exhibiting higher molecular weight than obtained without the use of polyhydroxy aromatic compound in the reaction mixture.

In accordance with a specific embodiment of the present invention, a first reaction mixture of at least one dihalo aromatic sulfone such as a bis(p-halophenyl)sulfone, at least one polyhydroxy aromatic compound such as phloroglucinol and at least one alkali metal carbonate, such as sodium carbonate and at least one organic amide, such as N-methyl-2-pyrrolidone is contacted under polymerization conditions including a period of time at a temperature sufficient for dehydration of the reactants and formation of reaction product, with the resulting product mixture being contacted with at least one polymerizable sulfur source; at least one organic amide, such as N-methyl-2-pyrrolidone; at least one alkali metal carboxylate, such as sodium acetate, and water, including water of hydration, in an amount within the range of up to about 30 moles, preferably within the range of up to about 20 moles, per mole of polymerizable sulfur source employed under polymerization conditions including a period of time at a temperature sufficient to form a branched aromatic sulfide sulfone polymer exhibiting higher molecular weight than obtained with the same reaction mixture excluding polyhydroxy aromatic compound.

Use of water in the greater amounts within the range described has been set out in U.S. Pat. No. 4,127,713, of Robert W. Campbell, incorporated here by reference. The use of water in greater amounts within the range set out results in polymers of higher inherent viscosity than that of polymers which are produced when lesser amounts of water are employed under otherwise comparable conditions.

When organic amide is used in optimum amount in proportion to the water present a reaction mixture results which, instead of being in the form of an apparently dry powder, is in the form of a moist powder, moist granules, or slurry of granules, depending on the amount of water used, thereby making possible filtration of the reaction mixture. Furthermore, when in the form of a slurry, the reaction mixture is easier to transfer for processing.

In the present invention, at least one dihalo aromatic sulfone, at least one polymerizable sulfur source, at least one alkali metal carbonate, at least one organic amide, at least one alkali metal carboxylate, at least one polyhydroxy aromatic compound and water are contacted under reaction conditions and with proportions of reactants sufficient to cause the reactants to react with each other to form branched aromatic sulfide sulfone polymer exhibiting molecular weight greater than obtained under the same conditions with the exception of using polyhydroxy aromatic compound.

In the most preferred embodiment of this invention a first reaction of dihalo aromatic sulfone and polyhydroxy aromatic compound in the presence of alkali metal carbonate is carried out under dehydration conditions to prepare a product mixture from these components before the remaining components of the polymerization reaction are incorporated into a reaction mixture.

Dihalo aromatic sulfones that can be employed in the process of this invention can be represented by the formula:

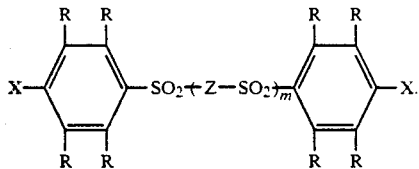

Where each X is selected from the group consisting of fluorine, chlorine, bromine, and iodine; Z is a divalent radical selected from the group consisting of

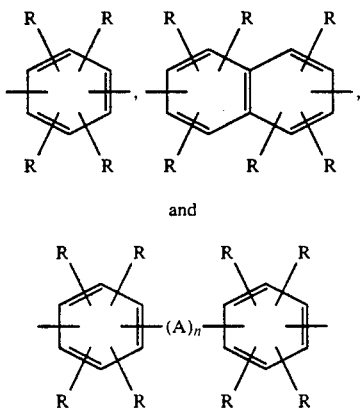

m is 0 or 1; n is 0 or 1; A is selected from the group consisting of oxygen, sulfur, sulfonyl, and $CR_2$ and each R is selected from the group consisting of hydrogen and alkyl radicals having 1 to about 4 carbon atoms, the total number of carbon atoms in all of the R groups in the molecular being 0 to about 12. Preferably, m is 0.

Examples of some dihalo aromatic sulfones that can be employed in the process of this invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(4-chlorophenylsulfonyl)benzene, 1-methyl-2,4-bis(p-fluorophenylsulfonyl)benzene, 2,6-bis(p-bromophenylsulfonyl) naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis[p-(p-bromophenylsulfonyl)phenyl]methane, 5,5-bis[3-ethyl-4-chlorophenylsulfonyl)phenyl]nonane, and the like, and mixtures thereof.

The polymerizable sulfur source employed that can be employed in the process of this invention includes, among others, alkali metal sulfides such as sodium sulfide, lithium sulfide, potassium sulfide, rubidium sulfide, cesium sulfide, and mixtures thereof and alkali metal hydrosulfides such as sodium hydrosulfide, lithium hydrosulfide, potassium hydrosulfide, rubidium hydrosulfide, cesium hydrosulfide, and mixtures thereof. The alkali metal sulfides and alkali metal hydrosulfides can be used in anhydrous form, as a hydrate, or as an aqueous mixture. Preferably, alkali metal sulfide or alkali metal hydrosulfide is employed in hydrated form.

The organic amides that can be used in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, -caprolactam, N-methyl -caprolactam, N,N'-ethylenedi-2-pyrrolidone, hexamethylphosphoramide, tetramethylurea, and the like, and mixtures thereof.

Alkali metal carboxylates which can be employed in the process of this invention can be represented by the formula $R'CO_2M$, where R' is a hydrocarbyl radical selected from alkyl, cycloalkyl, and aryl, and combinations thereof, such as alkaryl, aralkyl, and the like, the number of carbon atoms in R' is within the range of 1 to about 20 and M is an alkali metal cation selected from among ions of lithium, sodium, potassium, rubidium and cesium and mixtures thereof. If desired, the alkali metal carboxylate can be employed as a hydrate or as a solution or dispersion in water.

Among the alkali metal carboxylates which can be employed in the process of this invention are: alkali metal acetate, alkali metal propionate, alkali metal 2-methylpropionate, alkali metal butyrate, alkali metal valerate, alkali metal hexanoate, alkali metal heptanoate, alkali metal 2-methyloctanoate, alkali metal dodecanoate, alkali metal 4-ethyltetradecanoate, alkali metal octadecanoate, alkali metal beneicosanoate, alkali metal cyclohexanecarboxylate, alkali metal cyclododecanecarboxylate, alkali metal 3-methylcyclopentane, carboxylate, alkali metal cyclohexylacetate, alkali metal benzoate, alkali metal m-toluate, alkali metal phenylacetate, alkali metal 4-phenylcyclohexanecarboxylate, alkali metal p-tolyiacetate, alkali metal 4-ethylcyclohexylacetate, and the like, and the mixtures thereof in which the alkali metals are chosen from among sodium, lithium, potassium, rubidium and cesium.

Alkali metal carbonates are employed in the reaction mixture. Among the alkali metal carbonates useful in the invention are sodium carbonate, lithium carbonate, potassium carbonate, rubidium carbonate, cesium carbonate and mixtures thereof.

Among the polyhydroxy aromatic compounds useful as branching agents in the process of this invention are: 1,2,3-trihydroxybenzene (pyrogallol), 1,2,4-trihydroxybenzene (hydroxyquinol), 1,3,5-hydroxybenzene (phloroglucinol) and tris(4-hydroxyphenyl)methane (leucoaurin).

As indicated above, water can be employed as such, and/or it can be added as a hydrate of, and/or as a medium for polymerizable sulfur source and/or alkali metal carboxylate. The amount of water used is set out herein in terms of moles organic amide per mole of water and follows the system set out in U.S. Pat. No. 4,808,698, incorporated here by reference, in which it was found that using a molar ratio of organic amide to polymerizable sulfur source in the range of from about 2:1 to about 24:1, preferably about 4:1 to about 16:1, the organic amide to water molar ratio was best selected from within the range of about 0.4:1 to about 1.3:1, preferably about 0.5:1 to about 1:1, to provide aromatic sulfide/sulfone polymers of high molecular weight as reflected by the inherent viscosity values of the polymers.

Although the mole ratio of dihalo aromatic sulfone to polymerizable sulfur source can vary over a considerable range, generally it will be within the range of about 0.9:1 to about 2:1, preferably about 0.95:1 to about 1.2:1. The mole ratio of alkali metal carboxylate to polymerizable sulfur source can vary over a wide range but generally will be within the range of about 0.05:1 to about 4:1, preferably about 0.1:1 to about 2:1. Although the mole ratio of organic amide to polymerizable sulfur source can vary greatly, generally it will be within the range of about 2:1 to about 24:1, preferably about 4:1 to about 16:1. The mole ratio of alkali metal carbonate to polymerizable sulfur source will be within the range of about 1:1 to about 3:1, preferably about 1.5:1 to about 2.5:1. The mole ratio of polyhydroxy aromatic compound to polymerizable sulfur source can also vary but will generally be within the range of about 0.001:1 to about 0.1:1, preferably about 0.0025:1 to about 0.05:1. The order of addition of the components of the reaction mixture, except in forming prepolymer of dihalo aromatic sulfone and polyhydroxy aromatic compound, is not critical.

Although the reaction temperature at which the polymerization is conducted can vary over a considerable range, generally it will be within the range of about 160° C. to about 230° C., preferably about 170° C. to about 210° C. The reaction time can vary widely, depending in part on the reaction temperature, but generally will be within the range of about 10 minutes to about 3 days, preferably about 1 hour to about 8 hours. The reaction can be divided into two distinct stages with the first stage carried out at a temperature in the range of about 150° C. to about 200° C., preferably about 160° C. to about 190° C.; the second stage carried out at a temperature of about 170° C. to about 230° C., preferably about 180° C. to about 210° C.: the time of reaction of the first stage in a range of about 5 minutes to about 24 hours, preferably about 30 minutes to about 5 hours: and the time of the second stage in a range of about 5 minutes to about 3 days, preferably about 30 minutes to about 8 hours. The pressure should be sufficient to maintain the dihalo aromatic sulfone, water and the organic amide substantially in the liquid phase.

The aromatic sulfide sulfone polymers produced by the process of this invention can be separated from the reaction mixture by conventional procedures. e.g., by filtration of the polymer, followed by washing with water, or by dilution of the reaction mixture with water, followed by filtration and water washing of the polymer. If desired, at least a portion of the washing with water can be conducted at an elevated temperature, e.g., up to about 250° C. Water-miscible solvents such as acetone, methanol or the organic amide used in the polymerization can be used to assist in the washing of the polymer, if desired.

The aromatic sulfide sulfone polymers recovered from the reaction mixture in the process of this invention can suitably be treated to enhance the melt stability of the polymer according to the method for contacting with a zinc source as set out in U.S. Pat. No. 4,774,276 of Rex L. Bobsein et al, incorporated here by reference.

The aromatic sulfide sulfone polymers produced by the process of this invention can be blended with fillers, pigments, extenders, other polymers, and the like. They can be cured through crosslinking and/or chain extension e.g., by heating at temperatures up to about 480° C., in the presence of a free oxygen containing gas, to provide cured products having high thermal stability and good chemical resistance. They are useful in the production of coatings, films, molded objects, and fibers.

EXAMPLE I

This is a comparative example in which the process of the invention is carried out with the exception that a polyhydroxy aromatic compound is not added into the polymerization reaction mixture. Into a one liter, stirred autoclave constructed of 316 stainless steel were charged 0.375 mole bis(p-chlorophenyl)sulfone, 0.750 mole sodium carbonate and 1.500 mole N-methyl-2-pyrrolidone (NMP). The autoclave was closed and the agitator started. The contents of the autoclave were deoxygenated by purging with nitrogen gas. The temperature was raised to 200° C. and held there for 3 hours. The autoclave and contents were then cooled and the autoclave subsequently charged with 0.3788 mole sodium bisulfide, 0.375 mole sodium acetate, 2.74 moles water and 1.50 mole NMP. The temperature was raised to 200° C. and held for an additional 3 hours with constant stirring. After the second 3 hour period, an additional 100 mL of NMP was charged to the autoclave and the reaction mixture comprising a slurry of particles in a liquid. The polymeric product was washed with deionized water, heated to 85°–95° C., and filtered to remove water-soluble by-products. The product was dried in a vacuum oven at 150° C. to yield 79.3 grams of product. The inherent viscosity of the product was 0.32 dL/gram.

Inherent viscosities (I.V.) for these polymer samples were determined using a #200 cannon-Fenske routine type viscometer at 30° C. with NMP as the solvent. The concentration of polymer solutions for I.V. determinations was 0.5 grams of polymer per deciliter of solution. Inherent viscosities provide an indication of relative molecular weights of these polymer samples. Higher inherent viscosities are indicative of higher molecular weight polymers.

EXAMPLE II

This is a comparative example in which a similar procedure was followed as in Example I except that 0.0375 mole bisphenol A was added to the first autoclave charge and that the sodium bisulfide charge was reduced to 0.3409 mole in the second autoclave charge.

Into a one liter, stirred autoclave constructed of 316 stainless steel were charged 0.375 mole bis(p-chlorophenyl)sulfone, 0.750 mole sodium carbonate 0.0375 mole bisphenol A and 1.50 mole NMP. The autoclave was closed and the agitator started. The contents of the autoclave were deoxygenated by purging with nitrogen gas. The temperature was raised to 200° C. and held there for 3 hours. The autoclave and contents were then cooled to 50° C. The autoclave was then charged with 0.3409 mole sodium bisulfide. 0.375 mole sodium acetate, 2.63 mole water and 1.50 mole NMP. The temperature of the autoclave and contents was then raised to 200° C. and held for an additional 3 hours with constant stirring. After the second 3 hour hold period, an additional 100 mL of NMP was charged to the autoclave over a 5 minute period and the reaction mixture was cooled. The autoclave was opened and contained a crude reaction mixture comprising a slurry of particles in a liquid. The polymeric product was washed with hot deionized water six times and was dried in a vacuum oven at 150° C. to yield 90.7 grams of dried product having an inherent viscosity of 0.45 dL/gram.

EXAMPLE III

In this example, according to the invention, a similar procedure was followed as in Example I except that 0.00375 mole of phloroglucinol (as the dihydrate) was added to the first autoclave charge and that the sodium bisulfide charge was reduced to 0.3731 moles.

Into a one liter, stirred autoclave constructed of 316 stainless steel were charged 0.375 mole bis(p-chlorophenyl)sulfone, 0.750 mole sodium carbonate, 0.00375 mole phloroglucinol dihydrate and 1.50 mole NMP. The autoclave was closed and the agitator started. The contents of the autoclave were deoxygenated by purging with nitrogen gas. The temperature was increased to 200° C. and held there for 3 hours. The autoclave and contents were subsequently cooled. The autoclave was then charged with 0.3731 mole sodium bisulfide, 0.375 mole sodium acetate, 2.75 mole water and 1.50 mole NMP. The temperature of the autoclave was then raised to 200° C. and held there for an additional 3 hours. After the second 3 hour period, an additional 100 mL of NMP were charged to the autoclave over a 5 minute period and the reaction mixture was cooled. The autoclave was opened and contained a crude reaction mixture comprising a slurry of particles in a liquid. The product was washed with hot deionized water and was dried in a vacuum oven at 150° C. 84.7 grams of product having an inherent viscosity of 0.42 dL/gram were recovered.

EXAMPLE IV

In this example, according to the invention, a similar procedure was followed as in Example II, except that 0.00375 mole of phloroglucinol (as the dihydrate) was added to the first autoclave charge and that the sodium bisulfide charge was reduced to 0.3694 moles.

For Example IV, into a one liter, stirred autoclave constructed of 316 stainless steel were charged 0.375 mole bis(p-chlorophenyl)sulfone, 0.750 mole sodium carbonate, 0.00375 mole phloroglucinol dihydrate and 1.50 mole NMP. The autoclave was closed and the agitator started. The contents of the autoclave were deoxygenated by purging with nitrogen gas. The temperature was increased to 200° C. and held there for 3 hours. The autoclave and contents were subsequently cooled. The autoclave was then charged with 0.3694 mole sodium bisulfide. 0.375 mole sodium acetate, 2.76 mole water an 1.50 mole NMP. The temperature of the autoclave was then raised to 200° C. and held there for an additional 3 hours. After the second 3 hour hold period, an additional 100 mL were charged to the autoclave over a 5 minute period and the reaction mixture was cooled. The autoclave was opened and a crude reaction mixture comprising a slurry of particles in a liquid. The product was washed with hot deionized water and was dried in a vacuum oven at 150° C. 77.79 grams of product having an inherent viscosity of 0.31 dL/gram were recovered.

EXAMPLE V

In this example, according to the invention, a similar procedure was followed as in Example III, except that the first polymerization hold period was 5 hours.

Into one liter, stirred autoclave constructed of 316 stainless steel were charged 0.375 mole bis(p-chlorophenyl)sulfone, 0.750 mole sodium carbonate, 0.00375 mole phloroglucinol dihydrate with 1.50 mole NMP. The autoclave was closed and the agitator started. The contents of the autoclave were deoxygenated by purging with nitrogen gas. The temperature was increased to 200° C. and held for 5 hours. The autoclave and contents were subsequently cooled. The autoclave was then charged with 0.3731 mole sodium bisulfide, 0.375 mole sodium acetate, 2.75 mole water and 1.50 mole NMP. The temperature of the autoclave was then raised to 200° C. and held there for a additional 3 hours. After the second hold period, an additional 100 mL of NMP were charged to the autoclave and the reaction mixture was cooled. The autoclave was opened and contained a crude reaction mixture comprising a slurry of particles in a liquid. The product was washed with hot deionized water and was dried in a vacuum oven at 150° C. 81.1 grams of product having an inherent viscosity of 0.40 dL/gram were recovered.

EXAMPLE VI

In this example, according to the invention, a similar procedure was followed as in Example III, except that the amount of phloroglucinol dihydrate was increased to 0.01875 mole in the first autoclave charge, and in the second autoclave charge the sodium bisulfide was decreased to 0.350 mole and the water was decreased to 2.62 moles.

Into a one liter, stirred autoclave constructed of 316 stainless steel were charged 0.375 mole bis(p-chlorophenyl)sulfone, 0.750 mole sodium carbonate, 0.01875 mole phloroglucinol dihydrate with 1.50 mole NMP. The autoclave was closed and the agitator started. The contents of the autoclave were deoxygenated by purging with nitrogen gas. The temperature increased to 200° C. and held there for 3 hours. The autoclave and contents were subsequently cooled. The autoclave was then charged with 0.350 mole sodium bisulfide. 0.375 mole sodium acetate, 2.62 mole water and 1.50 mole NMP. The temperature of the autoclave was then raised to 200° C. and held there for a additional 3 hours. After the second 3 hour hold period, an additional 100 mL of NMP were charged to the autoclave and the reaction mixture was cooled. The autoclave was opened and contained a crude reaction mixture comprising a solid mass. The product was washed with hot deionized water and was dried in a vacuum oven at 150° C. 88.53 grams of product having an inherent viscosity of 0.40 dL/gram were recovered.

EXAMPLE VII

In this example, according to the invention, the preferred condition of dehydrating the phloroglucinol dihydrate in the first reaction mixtures is demonstrated. In this example, the first reaction was carried out in glassware and the first reaction product was transferred to a 1 liter stainless steel autoclave, admixed with further reagents comprising the second reaction mixture.

Into a one liter glass resin flask, equipped with a condenser and Dean-Stark trap, electric heating mantle and an overhead mechanical stirrer, were charged 0.00375 mole phloroglucinol dihydrate, 0.20 mole sodium carbonate, 0.05 mole bis(p-chlorophenyl)sulfone, 1.50 mole NMP and 1.227 mole toluene. The reaction mixture was heated to 136° C., causing reflux of volatile components into the condenser and Dean-Stark trap. A total of 0.7 mL of water was collected in the Dean-Stark trap during 90 minutes of continuous refluxing. The temperature was then raised to 185°–186° C. to remove the toluene. This first reaction mixture was cooled and the transferred into a one liter, stirred autoclave constructed of 316 stainless steel along with 0.325 mole bis(p-chlorophenyl)sulfone, 0.503 mole sodium carbonate, 0.3731 mole sodium bisulfide, 0.375 mole sodium acetate, 1.50 mole NMP and 2.75 mole water. The autoclave was closed and the agitator started. The contents of the autoclave were deoxygenated by purging with nitrogen gas. The temperature was raised to 200° C. and held there for 3 hours with constant stirring. After the 3 hour hold period, an additional 100 mL of NMP were charged to the autoclave and the reaction mixture was cooled. The autoclave was opened and contained a crude reaction mixture comprising a slurry of particles in a liquid. The product was washed with hot deionized water and was dried in a vacuum oven at 150° C. 87.0 grams of product having an inherent viscosity of 0.56 dL/gram were recovered.

EXAMPLE VIII

In this example, according to the invention, the preferred condition of dehydrating the phloroglucinol dihydrate in the first reaction mixture is demonstrated. In this example, both steps of the reaction are carried out in a one liter stainless steel autoclave.

Into a one liter, stirred autoclave constructed of 316 stainless steel, equipped with an overhead distillation condenser were charged 0.375 mole bis(p-chlorophenyl)sulfone, 0.750 mole sodium carbonate, 0.00375 mole phloroglucinol dihydrate, 1.50 mole NMP and 1.0 mole toluene. The autoclave was closed and the agitator started. The contents of the autoclave were deoxygenated by purging with nitrogen gas. A slow stream of nitrogen gas was swept through the head space of the autoclave to assist in dehydration of the reaction mixture. The temperature was raised and collection of condensate overhead started at 150° C. Total condensate collected was 90 mL. The temperature was increased to 200° C. and held there for 2 hours. The autoclave and contents were then subsequently cooled. The autoclave was then charged with 0.3731 mole sodium bisulfide, 0.375 mole sodium acetate, 2.75 mole water and 1.50 mole NMP. The temperature of the autoclave was then raised to 200° C. and held there for 3 hours. After the three hour hold period, an additional 100 mL of NMP were charged to the autoclave and the reaction mixture was cooled. The product was washed with hot deionized water and was dried in a vacuum oven at 150° C. 78.76 grams of product having an inherent viscosity of 0.35 dL/gram were recovered.

EXAMPLE IX

In this example, according to the invention, the preferred condition of dehydrating the phloroglucinol dihydrate in the first reaction mixture is demonstrated. In this example, both steps of the reaction are carried out in a one liter stainless steel autoclave and the effect of extending the first reaction hold period is demonstrated.

Into a one liter, stirred autoclave constructed of 316 stainless steel, equipped with an overhead distillation condenser were charged 0.375 mole bis(p-chlorophenyl)sulfone, 0.750 mole sodium carbonate, 0.00375 mole phloroglucinol dihydrate, 1.50 mole NMP and 1.0 mole toluene. The autoclave was closed and the agitator started. The contents of the autoclave were deoxygenated by purging with nitrogen gas. A slow stream of nitrogen gas was swept through the head space of the autoclave to assist in dehydration of the reaction mixture. A total of 115 mL of condensate was collected during heat up to 200° C. The autoclave and contents were held at 200° C. for 3 hours. The autoclave and contents where then subsequently cooled. The autoclave was then charged with 0.3731 mole sodium bisulfide, 0.375 mole sodium acetate, 2.75 mole water and 1.50 mole NMP. The temperature of the autoclave was then raised to 200° C. and held there for 3 hours. After the 3 hour hold period, an additional 100 mL of NMP were charged to the autoclave and the reaction mixture was cooled. The product was washed with hot deionized water and was dried in a vacuum oven at 150° C. 81.8 grams of product having an inherent viscosity of 0.26 dL/gram were recovered.

EXAMPLE X

In this example, according to the invention, the preferred condition of dehydrating the phloroglucinol dihydrate in a separate step is demonstrated.

Into a one liter, stirred autoclave constructed of 316 stainless steel, equipped with an overhead distillation condenser were charged 0.00375 mole phloroglucinol, 0.750 mole sodium carbonate. 1.50 mole NMP and 1.0 mole toluene. The autoclave was closed and the agitator started. The contents of the autoclave were deoxygenated by purging with nitrogen gas. A slow stream of nitrogen gas was swept through the head space of the autoclave to assist in dehydration of the reaction mixture. A total of 110 mL of condensate was collected during heat up to 200° C. The autoclave and contents were then cooled to 100° C. The autoclave was then charged with 1.00 mole NMP and 0.05 mole bis(p-chlorophenyl)sulfone. The temperature of the autoclave was then raised to 200° C. and held there for 3 hours. After the 3 hour hold period, the autoclave and contents were subsequently cooled. The autoclave was then charged with 0.3731 mole sodium bisulfide, 2.75 mole water, 0.375 mole sodium acetate. 0.325 mole bis(p-chlorophenyl)sulfone, 0.675 mole sodium carbonate and 0.50 mole NMP. The autoclave and contents were deoxygenated by purging with nitrogen gas. The temperature of the autoclave was raised to 200° C. and held there for 3 hours. After this 3 hour hold period, an additional 100 mL of NMP were charged to the autoclave and the reaction mixture was cooled. The product was washed with hot deionized water and was dried in a vacuum oven at 150° C. 85.3 grams of product having an inherent viscosity of 0.42 dL/gram were recovered.

We claim:

1. A process for producing branched polyarylene sulfide sulfone, said process comprising:
    (a) contacting at least one dihalo aromatic sulfone monomer with at least one polyhydroxy aromatic compound having at least three hydroxy groups, at least one organic amide and at least one alkali metal carbonate at a temperature and pressure and for a time sufficient to produce a first reaction product mixture;
    (b) contacting a reaction mixture comprising:
        (1) said first reaction product mixture,
        (2) at least one polymerizable sulfur source selected from the group consisting of alkali metal sulfides and alkali metal hydrosulfides,
        (3) at least one organic amide,
        (4) at least one alkali metal carboxylate, and
        (5) water
            at a temperature and pressure and for a time sufficient to produce branched polyarylene sulfide sulfone, and (c) recovering said branched polyarylene sulfide sulfone from said reaction mixture.

2. A process of claim 1 wherein said at least one dihalo aromatic compound is represented by the formula:

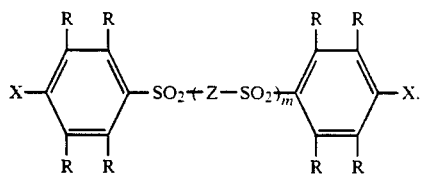

where each X is selected from the group consisting of fluorine, chlorine, bromine and iodine; z is a divalent radical selected from the group consisting of:

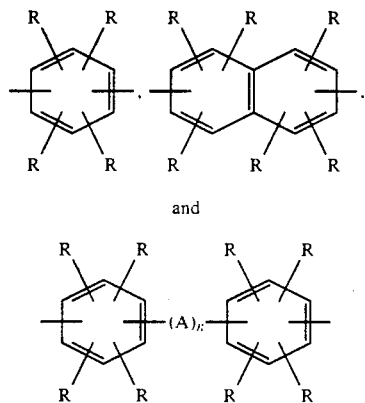

wherein m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

3. A process of claim 2 wherein said at least one dihalo aromatic compound is chosen from the group consisting of bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(-chlorophenyl-sulfonyl)benzene, 1-methyl-2,4-bis(p-fluorophenylsulfonyl)benzene, 2,6-bis(p-bromophenyl-sulfonyl)naphthalene, 7-ethyl-1,5-bis(p-iodophenylsul-fonyl)naphthalene, 4,4'-bis(p-chloro-phenylsulfonyl)-biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis[p-(p-bromo-phenylsulfonyl)phenyl]methane, 5,5-bis[3-ethyl-4-chlorophenylsulfonyl)phenyl]nonane and mixtures thereof.

4. A process of claim 3 wherein said at least one dihalo aromatic compound is bis(p-chlorophenyl) sulfone.

5. A process of claim 1 wherein said at least one alkali metal carbonate is chosen from the group consisting of sodium carbonate, lithium carbonate, potassium carbonate, rubidium carbonate and cesium carbonate and mixtures thereof.

6. A process of claim 5 wherein said at least one alkali metal carbonate is sodium carbonate.

7. A process of claim 1 wherein said at least one polyhydroxy aromatic compound is chosen from the group consisting of 1,2,3-trihydroxybenzene (pyrogallol), 1,2,4-trihydroxybenzene (hydroxyquinol), 1,3,5-hydroxybenzene (phloroglucinol) and tris(4-hydroxyphenyl)methane (leucoaurin).

8. A process of claim 7 wherein said at least one polyhydroxy aromatic compound is 1,3,5-hydroxybenzene (phloroglucinol).

9. A process of claim 1 wherein said at least one polymerizable sulfur source is chosen from the group consisting of sodium sulfide, potassium sulfide, rubidium sulfide, cesium sulfide, sodium hydrosulfide, lithium hydrosulfide, potassium hydrosulfide, rubidium hydrosulfide, cesium hydrosulfide, and mixtures thereof.

10. A process of claim 9 wherein said at least one polymerizable sulfur source is sodium sulfide.

11. A process of claim 1 wherein said at least one organic amide is chosen from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, -caprolactam, N-methyl- -caprolactam, N,N'-ethylenedi-2-pyrrolidone, hexamethylphosphoramide, tetramethylurea and mixtures thereof.

12. A process of claim 11 wherein said at least one organic amide is N-methyl-2-pyrrolidone.

13. A process of claim 1 wherein said at least one alkali metal carboxylate is represented by the formula $R'CO_2M$, where $R'$ is a hydrocarbyl radical selected from the group consisting of alkyl, cycloalkyl, and aryl and combinations thereof and the number of carbon atoms in $R'$ is within the range of 1 to about 20 and M is an alkali metal.

14. A process of claim 13 wherein said at least one alkali metal carboxylate is chosen from the group consisting of alkali metal acetate, alkali metal propionate, alkali metal 2-methylpropionate, alkali metal butyrate, alkali metal valerate, alkali metal hexanoate, alkali metal heptanoate, alkali metal 2-methyloctanoate, alkali metal dodecanoate, alkali metal 4-ethyltetradecanoate, alkali metal octadecanoate, alkali metal heneicosanoate, alkali metal cyclohexanecarboxylate, alkali metal cyclododecanecarboxylate, alkali metal methylcyclopentane, carboxylate, alkali metal cyclohexylacetate, alkali metal benzoate, alkali metal m-toluate, alkali metal phenylacetate, alkali metal 4-phenylcyclohexanecarboxylate, alkali metal p-tolylacetate, alkali metal 4-ethylcyclohexylacetate and the mixtures thereof and said alkali metal is chosen from the group consisting of sodium, lithium, potassium, rubidium and cesium.

15. A process of claim 14 wherein said at least one alkali metal carboxylate is sodium acetate.

16. A process of claim 1 wherein said contacting of (a) is at a pressure suitable to keep said dihalo aromatic sulfone monomer in solution, at a temperature in the range of about 150° C. to about 200° C. and a reaction time in a range of about 5 minutes to about 24 hours, and
said contacting of (b) at a pressure suitable to keep said organic amide substantially in the liquid phase, at a temperature of about 170° C. to about 230° C.

and for a time in a range of about 5 minutes to about 3 days.

17. A process of claim 16 wherein said contacting of (a) takes place at a pressure suitable to keep said organic amide substantially in the liquid phase, at a temperature in the range of about 160° C. to about 190° C. and for a time in a range of about 30 minutes to about 5 hours; and said contacting of (b)
is carried out at a pressure suitable to keep said organic amide substantially in the liquid phase, at a temperature of about 180° C. to about 210° C. and for a time in a range of about 30 minutes to about 8 hours.

18. A process for producing branched polyarylene sulfide sulfone, said process comprising:
(a) contacting bis (p-chlorophenyl) sulfone monomer with phloroglucinol, N-methyl-2-pyrrolidone and sodium carbonate at a temperature of about 175° C. for about 1 to about 3 hours to produce a first reaction product mixture;
(b) contacting a reaction mixture comprising:
 (1) said first reaction product mixture,
 (2) sodium hydrosulfide,
 (3) N-methyl-2-pyrrolidone,
 (4) sodium acetate, and
 (5) water
at a temperature of about 200° C. for about 3 hours to produce polyarylene sulfide sulfone, and
(c) recovering said polyarylene sulfide sulfone from said reaction mixture.

19. A process of claim 1 wherein the mole ratio of organic amide to water is within the range of about 0.4:1 to about 1.3:1. the mole ratio of dihalo aromatic sulfone to polymerizable sulfur source is within the range of about 0.9:1 to about 2:1, the mole ratio of alkali metal carboxylate to polymerizable sulfur source is within the range of about 0.05:1 to about 4:1. the mole ratio of organic amide to polymerizable sulfur source is within the range of about 2:1 to about 24:1, the mole ratio of alkali metal carbonate to polymerizable sulfur source is within the range of about 1:1 to about 3:1, and the mole ratio of polyhydroxy aromatic compound to polymerizable sulfur source is within the range of about 1:1 to about 2:1.

20. A process of claim 19 wherein the mole ratio of organic amide to water is within the range of about 0.5:1 to about 1:1, the mole ratio of dihalo aromatic sulfone to polymerizable sulfur source ranges from about 0.95:1 to about 1.2:1, the mole ratio of alkali metal carboxylate to polymerizable sulfur source ranges from about 0.1:1 to about 2:1, the mole ratio of organic amide to polymerizable sulfur source is within the range of about 4:1 to about 16:1, the mole ratio of alkali metal carbonate to polymerizable sulfur source is within the range of about 1.5:1 to about 2.5:1, and the mole ratio of polyhydroxy aromatic compound to polymerizable sulfur source is within the range of about 1.25:1 to about 1.75:1.

21. A branched polyarylene sulfide sulfone made by the process of claim 1.

22. A branched polyarylene sulfide sulfone made by the process of claim 18.

* * * * *